US010131821B2

(12) United States Patent
Hodsdon

(10) Patent No.: US 10,131,821 B2
(45) Date of Patent: *Nov. 20, 2018

(54) ADHESIVE LABEL LINER SHEET MODIFICATIONS FOR RETAINING UNNEEDED LABEL SECTIONS ON LINER

(71) Applicant: CCL Label, Inc., Framingham, MA (US)

(72) Inventor: Jerry G. Hodsdon, Milford, MA (US)

(73) Assignee: CCL Label, Inc., Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,749

(22) Filed: Dec. 29, 2017

(65) Prior Publication Data
US 2018/0118979 A1    May 3, 2018

Related U.S. Application Data

(63) Continuation of application No. 11/165,745, filed on Jun. 24, 2005, now Pat. No. 9,856,402, which is a continuation-in-part of application No. PCT/US03/01808, filed on Jan. 22, 2003.

(51) Int. Cl.
C09J 7/20     (2018.01)
G09F 3/10     (2006.01)

(52) U.S. Cl.
CPC ........ *C09J 7/20* (2018.01); *G09F 3/10* (2013.01); *C09J 2201/20* (2013.01); *Y10T 428/14* (2015.01)

(58) Field of Classification Search
None
See application file for complete search history.

(56) References Cited

U.S. PATENT DOCUMENTS

| | | |
|---|---|---|
| D2,856 S | 12/1867 | Stafford |
| D17,746 S | 9/1887 | Mellinger |
| D79,566 S | 10/1929 | Rau |
| D120,517 S | 3/1940 | Steffen |
| 2,276,297 A | 3/1942 | Flood |
| 2,303,346 A | 12/1942 | Flood |
| 2,304,787 A | 12/1942 | Avery |
| 2,321,184 A | 6/1943 | Butterworth |
| 2,331,019 A | 10/1943 | Flood |
| 2,372,994 A | 4/1945 | Welch |
| 2,420,045 A | 5/1947 | Krug |
| 2,434,545 A | 1/1948 | Brady, Jr. et al. |
| D168,758 S | 2/1953 | Odzer |
| 2,679,928 A | 6/1954 | Bishop, Jr. et al. |
| 2,681,732 A | 6/1954 | Brady |
| 2,765,205 A | 10/1956 | Capella et al. |
| 2,883,044 A | 4/1959 | Kendrick |
| D189,472 S | 12/1960 | Currie et al. |
| D190,360 S | 5/1961 | Cohen et al. |
| 3,038,597 A | 6/1962 | Brady, Jr. |
| 3,140,215 A | 7/1964 | Russell |
| 3,166,186 A | 1/1965 | Kam |
| 3,228,710 A | 1/1966 | Chodorowski |
| 3,230,649 A | 1/1966 | Kam |
| 3,315,387 A | 4/1967 | Heuser |
| 3,361,252 A | 1/1968 | Wise |
| 3,380,871 A | 4/1968 | Thomas |
| 3,480,198 A | 11/1969 | Repko |
| 3,500,364 A | 3/1970 | David et al. |
| 3,568,829 A | 3/1971 | Brady, Jr. |
| 3,769,147 A | 10/1973 | Komendat et al. |
| 3,822,492 A | 7/1974 | Crawley |
| 3,825,463 A | 7/1974 | Amann |
| 3,854,229 A | 12/1974 | Morgan |
| 3,859,157 A | 1/1975 | Morgan |
| 3,896,246 A | 7/1975 | Brady |
| 3,914,483 A | 10/1975 | Stipek, Jr. |
| 3,965,327 A | 6/1976 | Ehlscheid et al. |
| 4,032,679 A | 6/1977 | Aoyagi |
| 4,051,285 A | 9/1977 | Kramer |
| 4,060,168 A | 11/1977 | Romagnoli |
| 4,061,808 A | 12/1977 | Sato |
| 4,128,954 A | 12/1978 | White |
| 4,188,251 A | 2/1980 | Grass |
| 4,217,164 A | 8/1980 | La Mers |
| 4,264,662 A | 4/1981 | Taylor |
| 4,320,158 A | 3/1982 | Seeley |
| 4,356,375 A | 10/1982 | Josephy et al. |
| 4,398,287 A | 8/1983 | Spencer |
| 4,398,985 A | 8/1983 | Eagon |
| 4,428,857 A | 1/1984 | Taylor |
| 4,446,183 A | 5/1984 | Savagian |

(Continued)

FOREIGN PATENT DOCUMENTS

| | | |
|---|---|---|
| CA | 2409986 | 11/2001 |
| DE | 19519584 | 12/1996 |

(Continued)

OTHER PUBLICATIONS

Machine translation of DE2257435A1, published Jun. 7, 1973, retrived from Espacenet on Jun. 18, 2018 (Year: 1973).*

(Continued)

*Primary Examiner* — Anish P Desai
(74) *Attorney, Agent, or Firm* — McDonald Hopkins LLC

(57) ABSTRACT

One or more cuts is provided in a label liner sheet near the area of a cutout within the label, such as the center hole in a CD label, in order to facilitate reliable separation of the cutout from the label and retention of the cutout on the liner sheet as the label is peeled from the liner. The majority of the cut runs generally parallel to the cutout boundary underneath the cutout, and the ends of the cut cross the boundary at two separate boundary crossing points on either side of the portion of the cut running parallel to the boundary. The cut first causes a flap to be created in the liner sheet and partially lifted as the label is beginning to be peeled away. Thereafter, as the peel line passes the flap area, the cutout experiences the full retentive strength of the label's pressure sensitive adhesive primarily at the two boundary crossings, and the cutout is pulled from the label and retained on the liner sheet as the adhesive force overcomes the cohesive force.

20 Claims, 6 Drawing Sheets

(56) References Cited

U.S. PATENT DOCUMENTS

| | | |
|---|---|---|
| 4,454,180 A | 6/1984 | La Mers |
| 4,524,095 A | 6/1985 | Gockel et al. |
| 4,537,809 A | 8/1985 | Ang et al. |
| 4,545,517 A | 10/1985 | Olson |
| 4,560,600 A | 12/1985 | Yellin et al. |
| 4,584,219 A | 4/1986 | Baartmans |
| 4,599,125 A | 7/1986 | Buck |
| 4,619,851 A | 10/1986 | Sasaki et al. |
| 4,637,635 A | 1/1987 | Levine |
| 4,648,930 A | 3/1987 | La Mers |
| 4,700,535 A | 10/1987 | Wessel |
| 4,704,317 A | 11/1987 | Hickenbotham |
| 4,706,877 A | 11/1987 | Jenkins |
| 4,771,891 A | 9/1988 | Sorensen et al. |
| 4,787,158 A | 11/1988 | Vitol |
| 4,799,712 A | 1/1989 | Biava et al. |
| D300,692 S | 4/1989 | Le Brocquy |
| 4,837,088 A | 6/1989 | Freedman |
| 4,846,504 A | 7/1989 | MacGregor et al. |
| 4,850,612 A | 7/1989 | Instance |
| 4,865,204 A | 9/1989 | Vance |
| 4,878,643 A | 11/1989 | Stinson |
| 4,879,148 A | 11/1989 | Neaves et al. |
| 4,881,935 A | 11/1989 | Slobodkin |
| 4,881,936 A | 11/1989 | Slobodkin |
| 4,882,211 A | 11/1989 | McIntyre et al. |
| 4,890,862 A | 1/1990 | Buchholz |
| D306,321 S | 2/1990 | Gramera |
| 4,910,058 A | 3/1990 | Jameson |
| 4,951,970 A | 8/1990 | Burt |
| 4,952,433 A | 8/1990 | Tezuka |
| 4,978,146 A | 12/1990 | Warther et al. |
| 5,007,191 A | 4/1991 | Klein |
| 5,031,939 A | 7/1991 | Webendorfer et al. |
| 5,011,559 A | 8/1991 | Felix |
| 5,091,035 A | 2/1992 | Anhaeuser |
| 5,100,728 A | 3/1992 | Plamthbottam et al. |
| 5,129,682 A | 7/1992 | Ashby |
| 5,182,152 A | 1/1993 | Ericson |
| 5,192,612 A | 3/1993 | Otter |
| 5,230,938 A | 7/1993 | Hess |
| 5,284,689 A | 2/1994 | Laurash |
| 5,318,325 A | 6/1994 | Ipsen |
| 5,324,153 A | 6/1994 | Chess |
| 5,328,538 A | 7/1994 | Garrison |
| 5,332,265 A | 7/1994 | Groess et al. |
| 5,346,766 A | 9/1994 | Otter |
| 5,389,414 A | 2/1995 | Popat |
| 5,403,236 A | 4/1995 | Greig |
| 5,407,718 A | 4/1995 | Popat |
| 5,413,532 A | 5/1995 | Raby |
| 5,462,783 A | 10/1995 | Esselman |
| 5,484,167 A | 1/1996 | Donaldson et al. |
| 5,484,168 A | 1/1996 | Chigot |
| 5,487,929 A | 1/1996 | Rusincovitch |
| 5,501,393 A | 3/1996 | Walz |
| 5,509,693 A | 4/1996 | Kohls |
| 5,509,694 A | 4/1996 | Laurash et al. |
| 5,512,343 A | 4/1996 | Shaw |
| 5,520,990 A | 5/1996 | Rotermund |
| 5,534,320 A | 7/1996 | Raby |
| 5,536,546 A | 7/1996 | Nash |
| 5,580,640 A | 12/1996 | Kraft et al. |
| 5,601,314 A | 2/1997 | Burns et al. |
| 5,625,996 A | 5/1997 | Bechtel |
| 5,632,511 A | 5/1997 | Longtin |
| 5,633,071 A | 5/1997 | Murphy |
| 5,658,631 A | 8/1997 | Bernstein |
| 5,662,976 A | 9/1997 | Popat |
| 5,683,775 A | 11/1997 | Franklin |
| 5,686,159 A | 11/1997 | Langan |
| 5,705,245 A | 1/1998 | Loemker et al. |
| 5,720,499 A | 2/1998 | Sakashita |
| 5,730,826 A | 3/1998 | Sieber |
| 5,735,453 A | 4/1998 | Glok et al. |
| 5,756,175 A | 5/1998 | Ivashbum |
| 5,770,288 A | 6/1998 | Carney, Jr. |
| 5,782,494 A | 7/1998 | Crandall et al. |
| 5,788,284 A | 8/1998 | Hirst |
| 5,789,050 A | 8/1998 | Kang |
| 5,799,982 A | 9/1998 | McClure et al. |
| 5,842,722 A | 12/1998 | Carlson |
| 5,866,249 A | 2/1999 | Yarusso |
| 5,947,525 A | 9/1999 | Pollman |
| 5,958,536 A | 9/1999 | Geisinger et al. |
| 5,972,473 A | 10/1999 | Arakawa et al. |
| 5,993,928 A | 10/1999 | Popat |
| 5,981,013 A | 11/1999 | Russ et al. |
| 5,997,683 A | 12/1999 | Popat |
| 6,001,209 A | 12/1999 | Popat |
| 6,004,643 A | 12/1999 | Scheggelman |
| 6,110,552 A | 8/2000 | Casey et al. |
| 6,132,829 A | 10/2000 | Kennerly |
| 6,136,130 A | 10/2000 | Tataryan |
| 6,149,518 A | 11/2000 | Farrow |
| 6,159,570 A | 12/2000 | Ulrich |
| 6,170,879 B1 | 1/2001 | Rawlings |
| 6,221,192 B1 | 4/2001 | Walsh |
| 6,273,987 B1 | 8/2001 | Wilkey |
| 6,277,229 B1 | 8/2001 | Popat |
| D448,404 S | 9/2001 | Hamilton et al. |
| 6,284,708 B1 | 9/2001 | Oshima et al. |
| 6,331,018 B1 | 12/2001 | Roth et al. |
| 6,352,287 B2 | 3/2002 | Casagrande |
| 6,352,608 B1 | 3/2002 | Garden |
| 6,361,078 B1 | 3/2002 | Chess |
| 6,363,987 B1 | 4/2002 | Koch |
| 6,364,364 B1 | 4/2002 | Murphy |
| 6,391,136 B1 | 5/2002 | Stickelbrocks |
| 6,403,184 B1 | 6/2002 | Michlin |
| 6,403,191 B1 | 6/2002 | Casagrande |
| 6,405,777 B1 | 6/2002 | Lebbad |
| 6,408,918 B1 | 6/2002 | Hummell et al. |
| 6,410,111 B1 | 6/2002 | Roth |
| 6,410,113 B1 | 6/2002 | Roth |
| 6,413,604 B1 | 7/2002 | Matthews et al. |
| 6,423,391 B1 | 7/2002 | Roth et al. |
| 6,431,238 B1 | 8/2002 | Atkinson |
| 6,432,499 B1 | 8/2002 | Roth et al. |
| 6,479,118 B1 | 11/2002 | Atkinson |
| 6,482,490 B1 | 11/2002 | Hanahara et al. |
| 6,517,921 B2 | 2/2003 | Ulrich |
| 6,521,312 B1 | 2/2003 | Keiser |
| D471,933 S | 3/2003 | Hodson et al. |
| D476,031 S | 6/2003 | Hodsdon et al. |
| 6,579,585 B1 | 6/2003 | Garvic |
| D482,073 S | 11/2003 | Nakajo et al. |
| 6,656,555 B1 | 12/2003 | McKillip |
| 6,803,084 B1 | 10/2004 | Do |
| 6,837,957 B2 | 1/2005 | Flynn |
| 6,860,050 B2 | 3/2005 | Flynn |
| 6,861,116 B2 | 3/2005 | Emmert |
| 6,905,747 B2 | 6/2005 | Auchter |
| 6,926,942 B2 | 8/2005 | Garvic |
| 6,955,843 B2 | 10/2005 | Flynn et al. |
| 7,246,823 B2 | 7/2007 | Laurash et al. |
| 7,377,996 B2 | 5/2008 | Bilodeau |
| 7,438,322 B2 | 10/2008 | Miller |
| 7,459,193 B2 | 12/2008 | Utz |
| 7,579,076 B2 | 8/2009 | Ishikawa |
| 7,627,972 B2 | 12/2009 | Hodsdon et al. |
| 7,641,951 B2 | 1/2010 | Hodsdon et al. |
| 7,652,619 B1 | 1/2010 | Hibbard et al. |
| 7,709,071 B2 | 5/2010 | Wong et al. |
| 7,963,564 B2 | 6/2011 | Flynn et al. |
| 7,967,340 B2 | 6/2011 | Hofer et al. |
| D702,287 S | 4/2014 | Kott |
| D716,374 S | 10/2014 | Osmanovski et al. |
| 2002/0011306 A1 | 1/2002 | Hannington |
| 2002/0086127 A1 | 7/2002 | Hodsdon et al. |
| 2003/0133098 A1 | 7/2003 | Hoshino et al. |
| 2004/0033326 A1* | 2/2004 | Tataryan ............... B42D 5/027 428/42.3 |
| 2004/0078468 A1 | 4/2004 | Hedin et al. |

(56) References Cited

U.S. PATENT DOCUMENTS

| | | |
|---|---|---|
| 2004/0101646 A1 | 5/2004 | Hodsdon et al. |
| 2005/0087977 A1 | 4/2005 | Crum |
| 2005/0175807 A1 | 8/2005 | Bilodeau |
| 2005/0238836 A1 | 10/2005 | Hodsdon |
| 2006/0028015 A1 | 2/2006 | Ray |
| 2006/0049625 A1 | 3/2006 | Miller |
| 2006/0125230 A1 | 6/2006 | Laurash et al. |
| 2006/0147668 A1 | 7/2006 | Hirose et al. |
| 2006/0154012 A1 | 7/2006 | Ashton |
| 2007/0275204 A1 | 11/2007 | Ugolick |
| 2008/0054622 A1 | 3/2008 | Hodson et al. |
| 2008/0061548 A1 | 3/2008 | Kurunda et al. |
| 2008/0163973 A1 | 7/2008 | Euse |
| 2009/0022926 A1 | 1/2009 | Dangami |
| 2009/0246427 A1 | 10/2009 | Hincks et al. |
| 2010/0080946 A1 | 4/2010 | Hodsdon et al. |
| 2010/0116425 A1 | 5/2010 | Konsti et al. |
| 2010/0233412 A1 | 9/2010 | Wong et al. |
| 2014/0106132 A1 | 4/2014 | Hong et al. |
| 2017/0116890 A1* | 4/2017 | Li .......................... G09F 3/10 |

FOREIGN PATENT DOCUMENTS

| | | | |
|---|---|---|---|
| DE | 19741563 | | 3/1998 |
| DE | 19945254 | | 8/2001 |
| DE | 69909841 | | 5/2004 |
| DE | 202004011509 | | 9/2004 |
| EP | 0044889 | | 2/1982 |
| EP | 0297705 | | 1/1989 |
| EP | 0389112 | | 9/1990 |
| EP | 0488813 | | 6/1992 |
| EP | 0765514 | | 4/1997 |
| EP | 1319601 | | 6/2003 |
| EP | 1382458 | | 1/2004 |
| FR | 1568013 A | * | 5/1969 |
| FR | 1586336 A | * | 2/1970 |
| FR | 2634931 | | 2/1985 |
| GB | 2143204 | | 2/1985 |
| GB | 2177373 | | 1/1987 |
| JP | 07199503 | | 8/1995 |
| JP | 2000326944 | | 11/2000 |
| JP | 2001101827 | | 4/2001 |
| JP | 2005128458 | | 5/2005 |
| WO | 9219457 | | 11/1992 |
| WO | 9534879 | | 12/1995 |
| WO | 9847771 | | 10/1998 |
| WO | 0189821 | | 11/2001 |
| WO | 2003020597 | | 3/2003 |
| WO | 2004078468 | | 9/2004 |

OTHER PUBLICATIONS

Machine translation of EP0418608A1, published Mar. 27, 1991, retrived from Espacenet on Jun. 18, 2018 (Year: 1991).*
Machine translation of FR1568013A, published on May 23, 1969, retrived from Espacenet on Jun. 18, 2018 (Year: 1969).*
Machine translation of FR1586336A, published on Feb. 13, 1970, retrived from Espacenent on Jun. 18, 2018 (Year: 1970).*
International Search Report and the Written Opinion of the International Searching Authority, PCT/US14/18869, CCL Label, Inc., dated May 30, 2014.
International Search Report from Parent International Application No. PCT/US03/01808.
International Preliminary Examination Report from Parent International Application No. PCT/US03/01808.

* cited by examiner

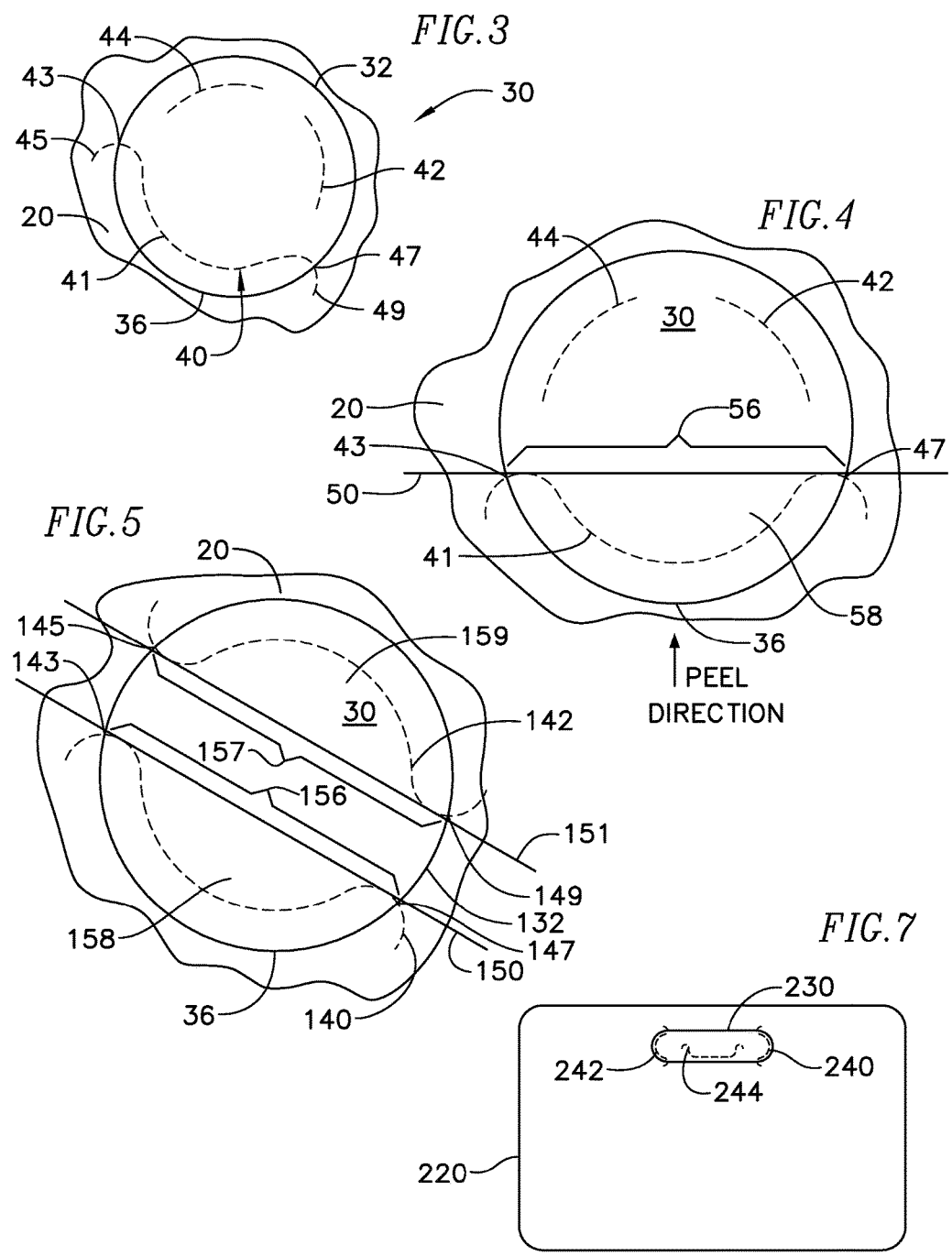

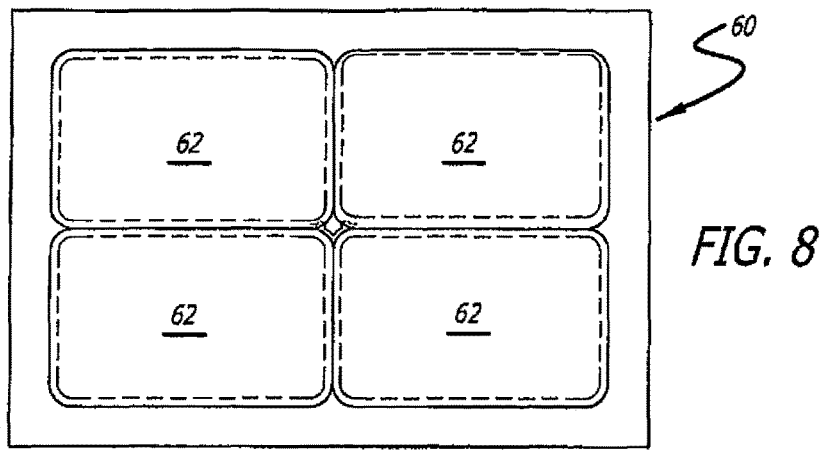
FIG. 8
FIG. 9
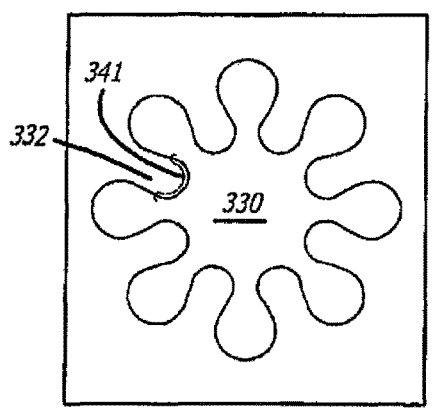
FIG. 10
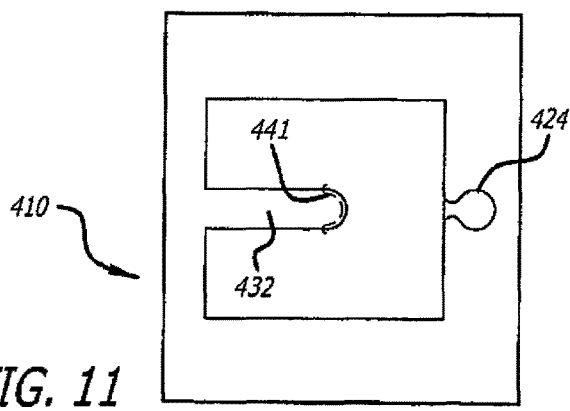
FIG. 11

PEEL DIRECTION

ADHESIVE LABEL LINER SHEET MODIFICATIONS FOR RETAINING UNNEEDED LABEL SECTIONS ON LINER

RELATED APPLICATIONS

This application is a continuation of U.S. patent application Ser. No. 11/165,745 filed Jun. 24, 2005 which is a continuation-in-part of international application no. PCT/US03/01808, filed Jan. 22, 2003, which designated the United States and was published in English each of which are incorporated by reference in their entireties.

FIELD OF THE INVENTION

The present invention relates to adhesive label sheets, and more particularly to modifications to an adhesive label liner sheet for retaining unneeded label sections on the liner when the label is removed from the liner sheet.

BACKGROUND OF THE INVENTION

Adhesive label sheets having at least one label and a liner sheet, in which the label is releasably adhered to the liner sheet by a pressure sensitive adhesive, are well known. The pressure sensitive adhesive on the back of the labels is usually, though not necessarily, of sufficient strength as to permanently adhere the label to an object to which the label is later affixed after the label has been peeled from the liner sheet and applied to the object. Such a pressure sensitive adhesive is generally referred to as a permanent pressure sensitive adhesive, as opposed to a releasable pressure sensitive adhesive. Even though the pressure sensitive adhesive is often of the permanent type, the labels can be easily removed from the liner because the liner, often referred to as the release liner, is covered with a non stick coating such as a thin layer of silicone. Labels and label sheets of this type are well known.

Labels of this sort can be manufactured and used in a variety of applications. One application for labels of this type is for use in labeling compact discs (CD's). International Publication WO 02/38371-A 1, assigned to the assignee of the present invention, describes one such label sheet for CD's. The label sheet is of a standard size such as 8½×11 inches, or A4, for feeding through a standard printer attached to a personal computer such as a laser printer or inkjet printer. The facestock contains two CD labels and several CD jewel case spine labels die cut into the facestock so that they can be removed from the remainder of the label sheet when the user is ready to apply the CD label to a CD, or the spine label to a jewel case spine. Also die cut into the facestock sheet are the center holes or cutouts within the center of the CD labels. The facestock includes holding tabs or "no touch tabs" held to the CD, so that the user can hold the CD label while it is being positioned over the CD for application thereon without touching an adhesive surface. The holding tabs are typically removed from the CD label after the CD label has been placed onto the CD by tearing along perforations or cuts and ties formed in the facestock.

The liner also has various die cuts in it for different purposes. Those cuts include: cuts to allow the two halves of the label sheet to be separated for separate handling after printing; a crescent shaped cut at one each of the holding tabs to assist the user in grasping the tab and using it to peel the CD label from the label sheet; and small cross hairs and arcuate sections in the center hole sections of the CD labels for die alignment purposes when setting up the manufacturing equipment. The holding tab having the crescent shaped cut at its end so that the user can easily grasp it and use it to peel the CD label from the label sheet will be referred to as the peel tab. The various cuts in the facestock and the liner sheet are shown and/or described in WO 02/38371-A1.

Even though the die cuts defining the CD label and the center hole section may pass completely through the facestock, the two sections nevertheless sometimes remain stuck slightly together. This is because the pressure sensitive adhesive on the back of the label spreads and interacts with the pressure sensitive adhesive on the back of the center hole section, causing the two sections to stick together slightly at their edges along the die cut boundary. The sticking of the pressure sensitive adhesive on the back side of the two pieces thus tending to hold the two pieces together is sometimes referred to as cohesion. In contrast, the tendency of the facestock to stick to the liner due to the normal action of the pressure sensitive adhesive is usually referred to as adhesion. For clarity of discussion, the terms "cohesion" and "adhesion" will be used herein in accordance with this nomenclature.

Due to the cohesive bond created by the spreading of the pressure sensitive adhesive on the backs of the CD label and the center hole section, when the CD label is peeled from the label sheet the center hole section sometimes coheres strongly enough to the CD label so that the CD label pulls the center hole section with it from the liner. The user must then perform the separate step of removing the center hole section from the CD label after the CD label's sticky side is already exposed.

This separate step can be awkward.

One method which has been suggested for preventing this cohesion problem and ensuring that the unneeded or waste section of the facestock remains on the liner when the label is peeled away, is by the use of skips. Skips are localized areas on the liner in which the release coating is modified, either by using a different release coating that constitutes a less effective non-stick agent, or by completely eliminating the release coating at the skip. The intended result is that the unneeded facestock section remains strongly adhered to the liner while the label is peeled away from the liner, leaving the unneeded section behind. Examples of label sheets or strips employing skips or other techniques that rely on differential bond strengths are U.S. Pat. Nos. 5,580,640; 6,273,987; 6,410,111; 6,423,391; and 6,432,499.

One drawback to the conventional skip approach is that attempting to use different release coatings in different areas, or different thicknesses of the same release coating in different areas, complicates the manufacturing process. The labels sheets are usually made in large continuous rolls, and attempting to create local and repeated small areas in those rolls in which the release coating is different, then applying the facestock, and then aligning those small localized areas with the label patterns later die cut into the sheets, undesirably complicates the manufacturing.

SUMMARY OF THE INVENTION

The inventor of the present invention has discovered that by placing one or more cuts in strategic locations in the liner sheet, the center hole section of a label such as a CD label will more reliably be left on the liner sheet when the label is removed from the liner sheet. In one embodiment, the liner sheet is die cut in such a way as to produce a flap which lifts slightly during the removal of the surrounding label. When that occurs, rather than the center hole label section peeling off of the liner with the rest of the label, the liner flap starts to lift with the center hole label section. When the peeling action reaches the end of the flap, the flap can no longer lift with the facestock sheet. Now there is an entire line through the center hole section along which the adhesive force between the facestock and the liner must be overcome. This adhesive resistance pulls at the center hole section at the two points along the peel line at which the center hole section coheres to the surrounding label. The adhesive force holding the center hole section to the liner is now sufficiently strong to overcome the cohesive force holding the center hole section to the label at the two outer points of the center hole section, and the center hole section begins to separate from the label. Now that the cohesive bond between the center hole section and the label has broken at the two points, the separation process continues rapidly until the flap and the waste facestock portion on the flap separates from the label. The peeling process then continues smoothly and the center hole section is left behind on the liner sheet.

In another view of the present invention, when the liner flap created by the cut in the liner begins to lift, the center hole label section now must be removed by shearing part of the center hole label section from the liner. The force required to remove a label from a surface by pulling it sideways in shear is greater than what is required for peeling the label. The cohesive bond between the label and the center hole label section does not exceed the force required to shear the center hole label section off of the liner, so the cohesive bond is broken and the center hole label section stays on the liner.

In one aspect therefore, the present invention takes a counter intuitive approach to separating the donut hole from the label. Namely, the present invention recognizes that, rather than increasing the force tending to separate the donut hole from the label as taught by prior art skip techniques, one way of ensuring reliable separation of the donut hole from the label is to initially decrease the separation force within a localized area. More specifically, the force tending to separate the donut hole from the surrounding label is initially decreased at a leading edge of the donut hole first reached by the peel line as the peel line progresses across the label.

The method and structure of the invention are particularly effective where the direction of removal of the surrounding label is consistent and known, such as in label sheets produced by the assignee of the present invention in which one or more peel tabs is provided to assist the user in peeling the label from the liner. Where the direction of peel is not consistent, a plurality of cuts may be made in the liner to facilitate separation of the center hole section from the label regardless of the direction of peel.

The present invention can be used for a variety of label sheets in which the label has a cutout therein. For example, in addition to a CD label sheet, the invention can be used for a name badge label sheet in which a hanger hole must be removed from the label. The invention can also be used in a label sheet in which an unneeded or waste section of the label sheet which is desired to be left behind is not necessarily a cutout within a single label. For example, the invention can be used in a label sheet having adjacent generally rectangular labels, with the labels having rounded corners such that an unneeded diamond shaped portion lies at the point where four of the rectangular labels meet. More generally, the invention can be used whenever there is an unneeded facestock section such that it is desirable to remove the label without also lifting the unneeded or otherwise adjacent facestock section with the label.

In another aspect, the invention is of a label sheet having a modified liner, the liner assisting an unused portion of the label being left behind when the label is peeled away from the label sheet, the modification including a cut in the liner, the cut including at least a first cut portion running along a boundary between the label and the unused portion and running underneath the unused portion, and second and third cut portions which curve to cross the boundary near the end points of the cut, thus creating a flap which partially lifts at first away from the general plane of the liner sheet when the label is being peeled away, the cut thereafter assisting the unused portion in separating from the label and remaining on the liner sheet as the label is being removed from the liner sheet. The label sheet can optionally have a tab, printed directions, arrows, or other means for encouraging a user to peel the label off from the liner in a predefined peel direction, with the cut and the peel tab cooperating together to ensure that the peeling progresses in a way that will first lift the leading edge of the flap, and finally reach the hinge of the flap at its rear.

In a further aspect the invention is of a label sheet having a facestock and a liner, the facestock sheet including a label and an unneeded portion lying at least partially internal to the label, the liner sheet being cut near the boundary area between the label and the unneeded portion in order to create a flap that allows the following steps to occur in sequence as a user is removing a label from the liner sheet: (a) a first corner of the internal portion is pulled upward away from a primary plane of the liner sheet, the first corner remaining adhered to a corresponding section of the liner sheet not lying within the primary plane; (2) the internal portion begins separating from the label; and (3) the internal portion completely separates from the label and is left behind on the liner sheet.

In yet another aspect the invention is of a method for altering the liner sheet such that, when a label is being peeled away from the liner sheet, the label having an internal portion that is not intended to be used as a label, a tensile force that would otherwise act to begin removing a leading corner of the internal portion is initially reduced, with the leading corner not being removed from the liner until the peel line has passed by that leading corner.

One advantage of this invention is that, when the liner sheet is already to be cut for some other purpose as in previous manufacturing processes, the center hole section can be induced to reliably separate from the label by the use of a simple and inexpensive cut which does not require any additional manufacturing steps.

Exemplary embodiments of the invention will be further described below with reference to the drawings, in which like numbers refer to like parts.

BRIEF DESCRIPTION OF THE DRAWINGS

FIG. 3 is a closeup view of the center hole section of the CD label and label sheet of FIG. 1, with a plurality of cuts in the liner sheet below the unused facestock portion according to one embodiment of the present invention being shown in phantom;

FIG. 4 is a further closeup of the center hole section of FIG. 2;

FIG. 5 is a closeup view of the center hole section of a CD label sheet, with the cuts in the liner sheet below the unused facestock portion according to a second embodiment of the present invention being shown in phantom;

FIG. 7 is a top plan view of a label sheet according to a third embodiment, in which the label is a name badge label and the cutout within the label is a hanger hole, with a plurality of cuts in the liner sheet according to this embodiment being shown in phantom;

FIG. 8 is a label sheet according to a fourth embodiment of the invention, in which the unneeded portion of the label sheet lies at the point where four labels come together, with a cut in the liner sheet according to this embodiment being shown in phantom;

FIG. 9 is a closeup of the area around the diamond shaped unneeded facestock section of the label sheet of FIG. 8;

FIG. 10 is a first example of a label sheet in which an unused portion of the facestock is primarily, though not completely, internal to the label;

FIG. 11 is a second example of a label sheet in which an unused portion of the facestock is primarily, though not completely, internal to the label;

DETAILED DESCRIPTION OF EXEMPLARY EMBODIMENTS

A typical label sheet includes a facestock sheet and a liner sheet. The facestock sheet includes one or more labels die cut therein, and one or more unused or waste portions of the facestock. The facestock is usually made of paper which may be written upon or printed upon by a laser printer or other printer attached to a personal computer, although the facestock material may be a printable metal foil, paper/metal foil, MYLAR®, plastic, or any other suitable material. For purposes herein, all such materials will be referred to as paper, and the assembly will be referred to as a paper assembly. A printable coating, such as an inkjet receptive coating, may be applied to the top surface so that the surface can be printed thereon. For purposes herein, it will be understand that the term "printing" includes writing by pen or ink, typewriting, laser printing, ink jet printing, or any other manner of placing text or graphics thereon. The facestock sheet has a pressure sensitive adhesive on it which typically is strong enough to permanently adhere to whatever the label is placed on after being removed from the liner. The liner, however, is coated with a nonstick release material such as a thin layer of silicone so that the label can be easily peeled from the liner. It is not necessary that the pressure sensitive adhesive be a permanent pressure sensitive adhesive; it can be a removable adhesive i.e., a weak pressure sensitive adhesive. The foregoing is well known within the art of label sheet manufacturing.

Figure 1:
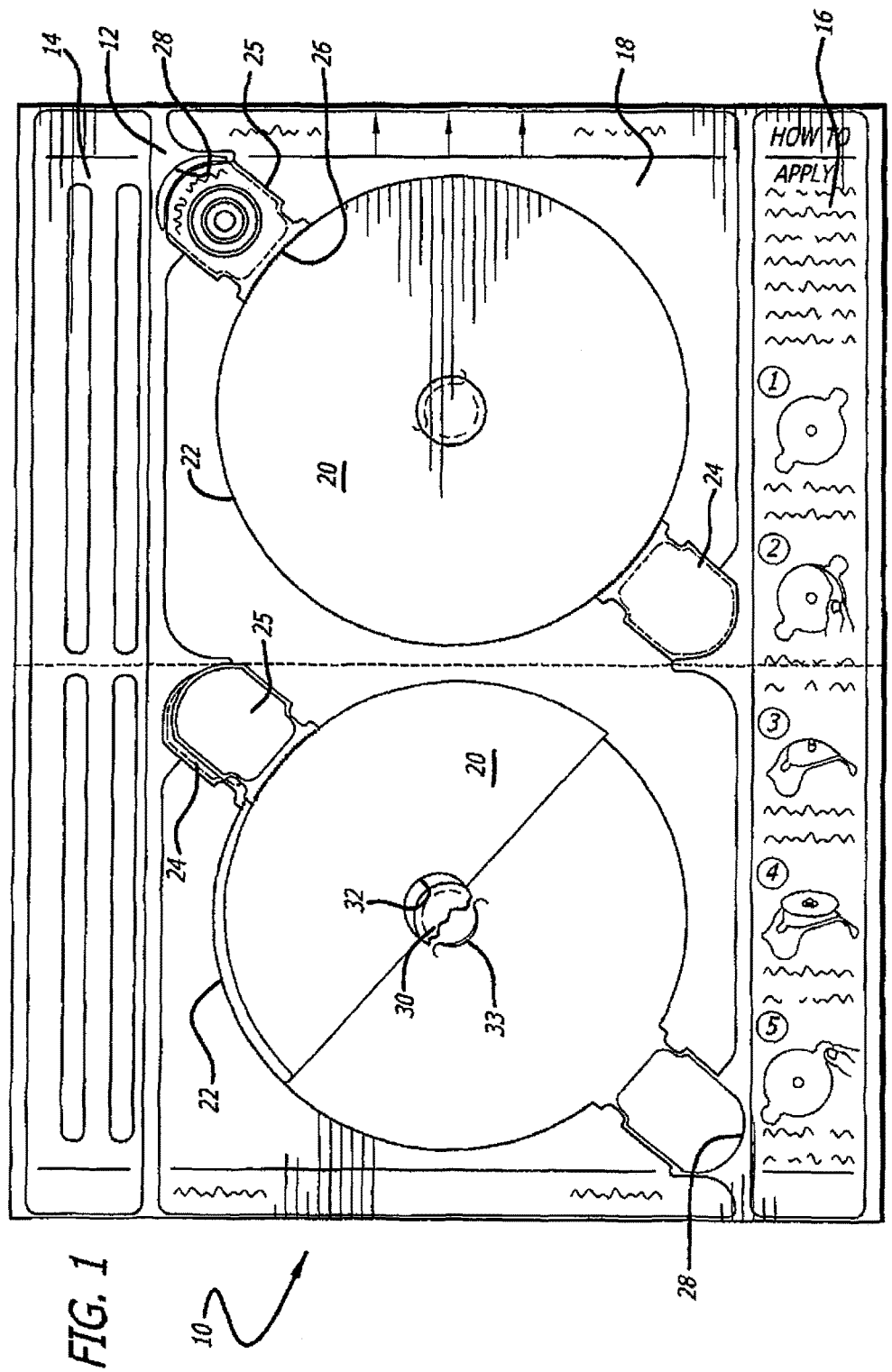
FIG. 1 is top view of a CD label sheet according to one embodiment of the present invention as one of the CD labels is being peeled away, with the center hole section 30 shown in fragment.

Label sheets may come in a variety of configurations. In FIG. 1 label sheet or label assembly 10 includes a release liner or liner sheet 12, and a facestock or facestock sheet 18. Also made from the facestock material are areas 14 and 16. Area 14 can include, for example, jewel case spine labels die cut into the facestock. Area 16 can include, for example, additional jewel case spine labels, or can contain written instructions for using the label sheet. In the exemplary embodiment label assembly 10 as shown the label assembly includes two CD labels 20 defined by respective circular die cuts 22 within the facestock 18. Each CD label 20 includes a peel tab 25 and a holding tab 24 formed in the facestock 18. The peel tabs 25 and holding tabs 24 are attached to the CD labels along weakened separation lines 26 which may be created by perforations or cuts and ties. A crescent shaped slot 28 is cut all the way through the facestock sheet 18 and the liner 12 at the peel tab 25 on each CD label 20 in order to facilitate grasping the tab 25 and using the tab 25 to peel the CD label 20 away from the liner. Internal to each CD label 20 is a round cutout section or center hole section 30. For ease of discussion, center hole section 30 will hereafter be referred to as the donut hole 30, and it will be understood that donut hole 30 refers to the unneeded portion 30 of the facestock 18 which is not used as part of CD label 20. It will also be understood, however, that the present invention is in no way limited to use with round holes or round labels, but is widely applicable to many label sheet configurations in which it is desirable to peel one section of a facestock away while leaving another section of the facestock on the release liner. Such configurations could include not only label sheets having waste portions, but label sheets having adjacent labels in which it is desirable to peel away only one label for use at a time, leaving the other label behind for peeling away later. Donut hole 30 is defined by die cut 32, which defines the boundary between CD label 20 and donut hole 30. Up to this point, the foregoing CD label sheet is described in greater detail in International Publication No. WO 02/38371-A1, which is assigned to the assignee of the present invention.

The cuts shown in phantom in FIG. 1 and the slit 33 formed in liner 12 are not described in International Publication No. WO 02/38371-A1 and do form part of the present invention according to a first embodiment used for CD label sheets. In the figure, donut hole 30 is shown in fragment. The rear portion of the donut hole 30, peeled away last, is shown still attached to liner 12. The leading edge of donut hole 30, which in the figure as illustrated would be separated from label 20 and attached to liner 12 including the flap formed by slit 33, is cut away and not shown in order to reveal the structure and operation of the slit 33 in liner 12. Although exemplary label assembly 10 is shown with discrete facestock areas 14, 16 and 18 on liner sheet 12 with gaps between the separate areas, many other configurations are possible including label sheets in which the facestock completely covers the liner sheet. It will also be understood and apparent in view of the description which follows that the invention can be used with many other configurations of labels and label sheets.

The structure of the liner 12 including modifications thereto according to the one embodiment of the present invention will now be described in greater detail with reference to FIGS. 3 and 4, which are close ups of only donut hole 30 and the immediately surrounding area of CD label 20. Cuts 40, 42 and 44 are formed in the liner sheet by die cutting immediately below donut hole 30, and are shown in phantom. Cuts 42 and 44 are merely for die alignment purposes and form no part of the present invention; such cuts are shown but not described in International Publication No. WO 02/38371-A1. Cut 40 includes three sections: a first cut section 41 and two end sections 45 and 49. First cut section 41 lies inside the boundary 32 which separates donut hole 30 from surrounding CD label 20, and generally parallels or follows the contour of the boundary 32 for some distance. Arcuate or semi-circular cuts 45 and 49 at the ends of cut 40 cause the cut to cross boundary 32 at first and second boundary crossing points 43 and 47. It is preferred, but not strictly necessary, that the ends 45 and 49 of the cut be arcuate or semi-circular, and cross the boundary at generally right angles to boundary 32. The two boundary crossings 43 and 47 define a line 50 which cuts through an interior portion of donut hole 30, and also define an uncut chord 56 along line 50, the uncut chord 56 also defining a hinge which in turn defines flap 58 within liner sheet 12. Preferably, first cut section 41 runs less than 5 mm, more preferably less than 2 mm, and more preferably runs approximately 1 mm, from donut hole/label boundary 32, and runs underneath donut hole 30. Thus, flap 58 formed within liner 12 lies underneath donut hole or other unused portion 30. It will also be understood that although portion 30 is referred to as being unused or unneeded, it need not be strictly unused or unneeded for any other purposes. Rather, the words "unused" and "unneeded" in the specification and in the claims will refer merely to the fact that it is desirable for this portion of the facestock to be left behind on the liner sheet when the label is peeled away.

Flap 58, cut 40 in liner 12, and boundary crossings 43 and 49 are most advantageously oriented as shown in FIG. 4 with respect to the anticipated peel direction. More particularly, the leading edge of flap 58 is preferably oriented such that the peel line first reaches flap 58 at the flap's leading edge, and thereafter continues parallel to uncut chord 56 until it reaches and passes uncut chord 56. In this way, the peel line reaches boundary crossings 43 and 47 roughly simultaneously. Additionally, the first cut section 41 between the first and second label boundary crossings 43, 47 has a tangent that is perpendicular to the anticipated peel direction. In FIG. 1, flap 58 is oriented with respect to the peel direction by orienting flap 58 with respect to peel tab 25 such that the peel progresses in the desired direction. Together, peel tab 25 and boundary crossings 43 and 47 define an isosceles triangle, with the base of the isosceles triangle defining the uncut chord 56 through donut hole 30. Preferably, uncut chord 56 covers at least 60 degrees of arc along label boundary 32, more preferably covers at least 90 degrees of arc, and more preferably still covers about 160 degrees of arc. Similarly, the curvature of the flap encompasses at least 60 degrees of arc, more preferably covers at least 90 degrees of arc, and more preferably still covers about 160 degrees of arc.

Without cut 40, as with prior art labels, when the peeling of the label progressed along the peel direction to reach leading edge 36 of the donut hole 30, the adhesive on the back of label 20 and donut hole 30 created a cohesive force that tended to hold donut hole 30 to label 20 as label 20 was being peeled away from liner 12. At the leading edge of donut hole 30 only a small area of donut hole 30 opposed the cohesive force. The cohesive force along the boundary at leading edge 36 would be stronger than the adhesive force tending to hold donut hole 30 to liner 12, thus causing donut hole 30 to begin peeling away from liner 12 without separating from label 20. Once started, this peeling of donut hole 30 with label 20 up from liner 12 would normally continue until entire donut hole 30 was removed from liner 12, still attached to label 20 by cohesion.

With cut 40, a different sequence occurs. As the peel line is progressing in the peel direction shown in FIG. 4, first cut portion 41 causes a leading edge of flap 58 to begin lifting along with the leading edge 36 of donut hole 30. That is, the modification to the liner is such that when the label is being peeled away from the liner sheet, a peel force or tensile force tending to pull leading edge 36 of the donut hole away from liner 12 is actually initially reduced due to the existence and action of flap 58. In one view, flap 58 allows the area of adhesion and hence the potential adhesive force to accumulate as the peel line passes leading edge 36. As the peel line progresses toward uncut chord 56, liner sheet flap 58 continues to lift along with label 20. Finally, the peel line reaches the hinge formed along uncut chord 56. At that point, the relatively large adhesive force created by adhesion along line 56 and the surrounding areas which has been allowed to accumulate, along with shear forces resulting from the changed angle of the label, oppose any further upward movement of donut hole 30. Because the area of adhesion was initially allowed to accumulate, the area of adhesion and hence the adhesive force which opposes the cohesion is now increased. This opposition to any further upward movement is concentrated primarily at boundary crossing points 43 and 47 and the immediate vicinity. At this point, the adhesive force tending to hold donut hole 30 down onto liner 12 is sufficiently strong to overcome the cohesive force along boundary 32 at boundary crossings 43 and 47, and the donut hole 30 begins to separate from label 20 at the boundary crossing points. Once begun, the separation rapidly progresses along boundary 32 toward donut hole leading edge 36. Meanwhile, as the peeling of label 20 continues the separation of donut hole 30 from label 20 continues in the peel direction away from leading edge 36 of donut hole 30.

Figure 2:
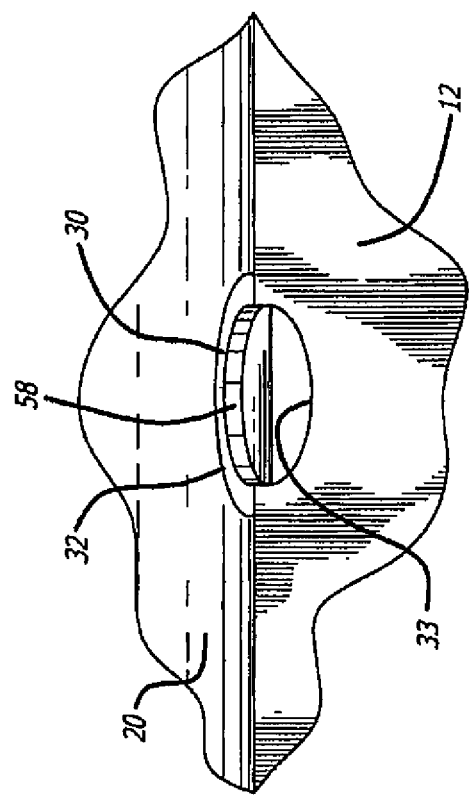
FIG. 2 is a closeup side perspective view of the center hole label section of FIG. 1, showing the liner flap lifting from the liner.

FIG. 2 is a closeup side perspective view of the center hole label section of FIG. 1, but showing the leading edge of donut hole 30 and liner flap 58 just beginning to lift from the rest of liner 12. Sequentially, FIG. 2 would occur slightly before FIG. 1. The thickness of flap 58 in FIG. 2 is exaggerated for illustration purposes. In this figure, donut hole 30 is still cohered to label 20. The peeling action or peel line has now reached the back of flap 58. Slit 33 created by cut 41 is at its fully open position. Any further peeling action will tend to pull donut hole 30 out from the center of label 20 because the flap can no longer lift and any further lifting of donut hole 30 is opposed by a relatively large area of adhesion between donut hole 30 and liner 12.

FIGS. 6A-6D are sequential close up cross sectional views of the CD label 20 and donut hole 30 as the label is being peeled away from the liner sheet. The thicknesses of the label 20, donut hole 30, and liner 12 are exaggerated for illustration purposes.

Figure 6A:
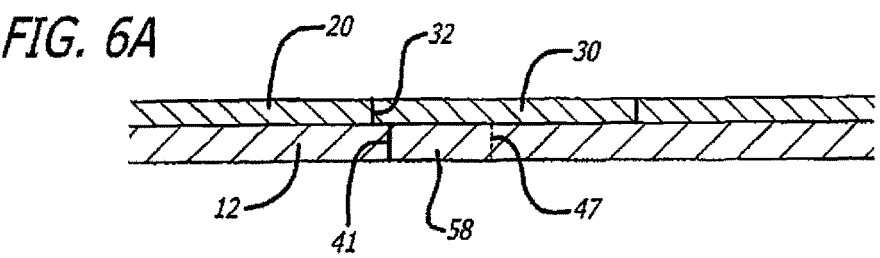
FIG. 6A is a cross sectional view of the center hole section of one CD label in FIG. 1.

FIG. 6A shows donut hole 30 defined by a cut along label boundary 32 within label 20. Cut 41 in liner 12, with the cut 41 crossing label boundary 32 at boundary crossing 47 shown in phantom, defines a flap 58 in liner 12.

Figure 6B:
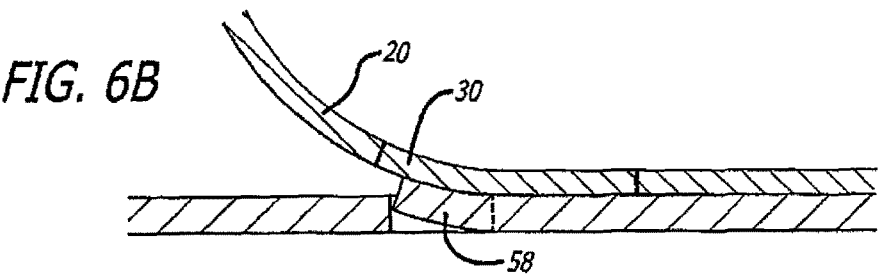
FIG. 6B shows the CD label sheet of FIG. 6A as the CD label is being peeled away from the liner sheet, with the center hole portion not yet separating from the label.

In FIG. 6B, which approximately corresponds to FIG. 2, label 20 is being removed from liner 12. The peel line has just reached the beginning edge of donut hole 30. Even though donut hole 30 is completely or nearly completely cut away from label 20 by the die cut in the facestock, the cohesion between the adhesive on the back of label 20 and the adhesive on the back of donut hole 30 along label boundary 32 keeps donut hole 30 attached to label 20 along their respective edges. Cut 41 in liner 12 allows liner flap 58 to begin lifting with donut hole 30, such that flap 58 no longer lies in the same plane as the major plane of liner sheet 12. As used herein, the term "major plane" refers to the primary plane of liner sheet 12 in the area generally surrounding donut hole 30, without regard to small or localized bends, wrinkles, or waves in liner sheet 12.

Figure 6C:
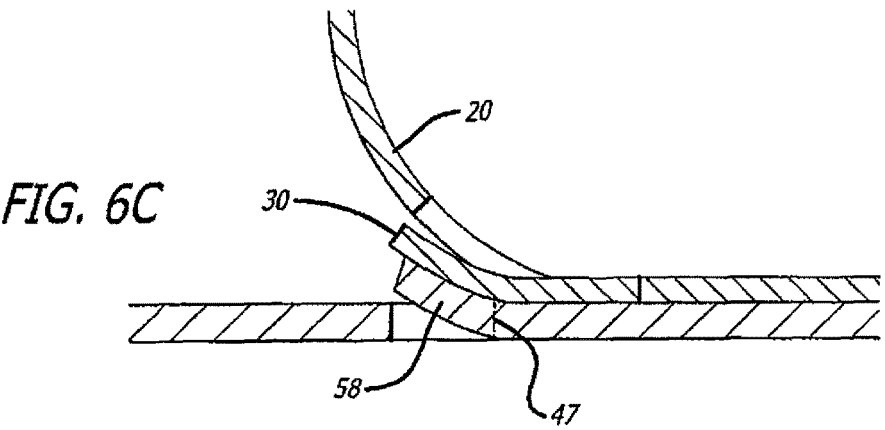
FIG. 6C shows the CD label sheet of FIG. 6A as the CD label is being peeled away from the liner sheet, with the center hole section beginning to separate from the label.
Figure 6D:
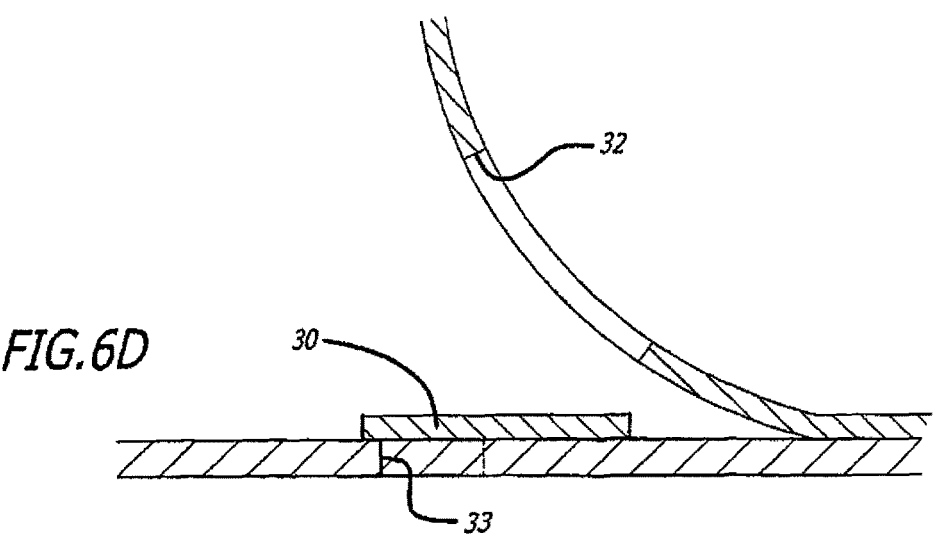
FIG. 6D shows the CD label sheet of FIG. 6A with the center hole section now completely separated from the label.

In FIG. 6C, which approximately corresponds to FIG. 1, the peel line has reached boundary crossing 47 at the back of flap 58, and flap 58 can rise no further. Now the adhesive force tending to hold flap 58 to donut hole 30 across a significant area of donut hole 30 is strong enough to overcome the cohesive forces along the label boundaries, especially at boundary crossing 47, and donut hole 30 separates from label 20.

In FIG. 60 flap 58 has relaxed back down to the major plane of liner 12. Donut hole 30 remains fixed to liner 12, and has separated completely from label 20. Thus, the invention takes the counter intuitive approach of actually initially decreasing the force which would tend to separate the donut hole's leading edge from the liner.

In the embodiment shown in FIG. 1, the user is encouraged to peel the label along a predefined peel direction via crescent shaped cutout 28 within liner 12 and peel tab 25. The construction and use of this cutout are described more fully in International Publication No. WO 02/38371-A 1. Other means of encouraging the user to peel along a particular direction, such as by straight cuts across the length of the liner or written directions, are also well known within the label making art, and can also be used in conjunction with the present invention. If the user were equally encouraged or prone to peel the label in either direction made possible by pulling on either peel tab 25 or holding tab 24, the liner could be modified to take either direction into account. FIG. 5 shows an embodiment in which the liner 12 underneath donut hole 30 is modified by forming first cut 140, and additionally second cut 142. Both cuts 140 and 142 follow a contour of boundary 132 between the donut hole and surrounding label area, and both cuts cross boundary 132 at each of two points 143, 147 and 145, 149, respectively. As described above with reference to FIGS. 3 and 4, the two boundary crossings 143, 147 and 145, 149 for each of the first and second cuts 140, 142 define lines 150, 151 which cut through an interior portion of donut hole 30, and also define uncut chords 156, 157 along lines 150, 151, respectively, the uncut chords 156, 157 also defining hinges which in turn define first and second flaps 158, 159 within liner sheet 12. In this way the label separates from the donut hole just as easily regardless of whether the label is peeled off in one direction or in the opposite direction.

FIG. 7 shows a further embodiment in which label 220 is a name badge label having a hanger hole 230 therein so that the label may be placed around hanger hardware. In this embodiment, it is not presumed that the label will be peeled along any particular predefined peel direction. Rather, three cuts 240, 242 and 244 are each die cut into the liner sheet in the area near the boundary between label 220 and center hole 230. The user is unlikely to peel the label beginning at the top edge directly above center hole 230, and for that reason no fourth cut is provided at the edge of center hole 230 nearest to the top edge. Instead, the user is likely to, or can be encouraged to, peel the label from the liner at either the left edge of label 220, the right edge of label 220, the bottom edge of label 220, or any one of the four corners shown. Whichever of those ways the user begins peeling the label, the peeling will encounter one or more cuts in a liner sheet according to the present invention, thus facilitating reliable separation of center hole 230 from label 220 as the label is peeled away for use. Although it is desirable to orient the cut in a particular direction with respect to the peel line, it is not strictly necessary to do so, as illustrated in FIG. 7 in which the exact peel direction is not necessarily known.

A fourth environment and fourth embodiment are shown in FIGS. 8 and 9. In FIG. 8, a label sheet 60 contains a number of generally rectangular shaped labels 62. The corners of the labels 62 are rounded. As shown in the close up of FIG. 9, at the area where four of the generally rectangular labels 62 come together an unused diamond shaped portion of the facestock is formed. Cut 80 is formed in the liner sheet below the unused diamond shaped facestock portion. Cut 80 includes a first cut portion 82, and second and third cut portions 84 and 86. First cut portion 82 generally follows a contour of a boundary 64 between label 62 and the unused portion, and second and third cut portions 84 and 86 include arcuate semi-circular cut portions which cross the boundaries.

The present invention is useful in facilitating separation of donut holes from labels where the donut hole or other hole lies completely internal to a label. However, the invention can also be used in applications where the unused section is not completely internal to the label. FIGS. 10 and 11 show embodiments in which the unused portions of the facestock do not lie completely internal to the label. In FIG. 10, for example, a label or adhesive applique 330 is formed by die cutting a label sheet or applique sheet 310. Unused portion 332, for example, lies partially but not completely internal to label 330. Die cut 341 assists label 330 in peeling away from sheet 310 while leaving unused portion 332 on the liner. FIG. 11 shows an additional embodiment in which the unneeded facestock portion 432 lies partially but not completely internal to label 430. In this embodiment, peel tab 424 encourages the user to peel label 430 along a peel direction that makes most advantageous use of cut 441, similarly to as described in the embodiments of FIGS. 1-5 and their accompanying descriptions.

Figure 12:
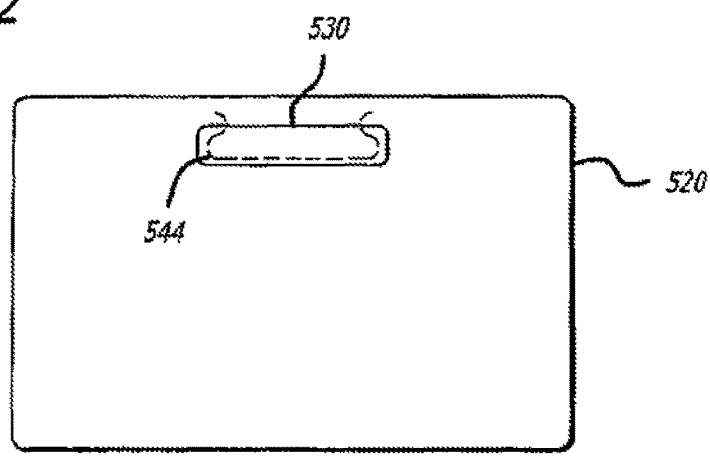
FIG. 12 is a top plan view of a fifth embodiment of the invention, in which the label is a name badge label and the cutout within the label is a hanger hole, with a single continuous cut in the liner sheet according to this embodiment being shown in phantom.

FIG. 12 is a top plan view of a fifth embodiment of the invention, in which the label is a name badge label 520 and the cutout 530 within the label is a hanger hole, with a single continuous cut 544 in the liner sheet.

Figure 13:
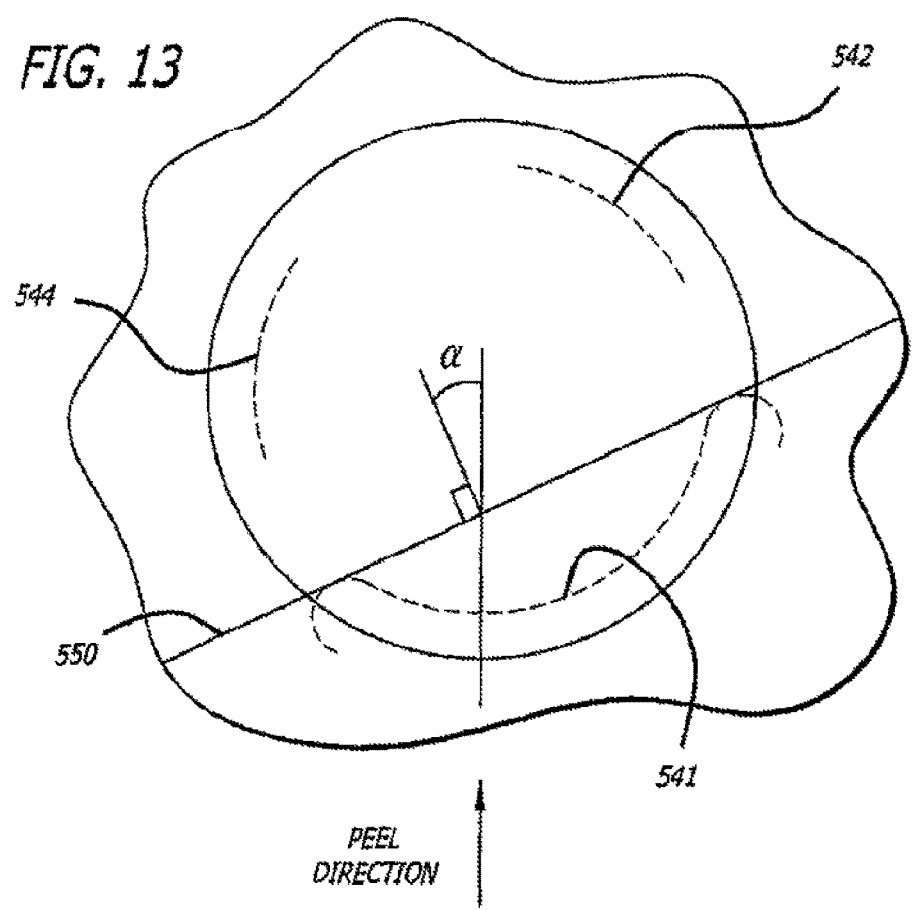
FIG. 13 is a top plan view of a sixth embodiment of the invention, in which the cuts are rotated with respect to the peel direction.

FIG. 13 is a top plan view of a sixth embodiment of the invention, in which the cuts 541, 542, and 544 are rotated at an angle α with respect to the peel direction. It has been found that rotating the cuts at an angle of α=20°-45° from the peel direction produces generally good results. In other words, uncut chord 550 defined by the points at which cut 541 crosses underneath the boundary of the cutout, defines an angle of approximately 45°-70° with respect to the intended peel direction.

It will be appreciated that the term "present invention" as used herein should not be construed to mean that only a single invention having a single essential element or group of elements is presented. Rather, any new and nonobvious element, and any new and nonobvious combination of elements, constitutes a separate invention. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the principles of the present invention can be used with many shapes and configurations of labels and unneeded sections, and with many different materials and types of adhesives and release coatings. Although the shapes of the cuts illustrated herein have been found to be particularly advantageous, the invention is not necessarily limited to particularly shaped cuts. Similarly, peel tabs can come in many shapes and configurations, and the term "peel tab" as used in the claims should not be limited to any particular shape or configuration. Accordingly, it is to be understood that the detailed description and the accompanying drawings as set forth hereinabove are not intended to limit the breadth of the present invention, which should be inferred only from the following claims and their appropriately construed legal equivalents. In the claims, where the term "means for" appears, that phrase is intended to be interpreted in accordance with 35 U.S.C. § 112, paragraph 6; similarly, where the term "means for" does not appear in a claim, the claim is intended to not be interpreted under 35 U.S.C. § 112, paragraph 6.

What is claimed is:

1. A label sheet comprising:
   a liner sheet; and
   a facestock sheet releasably coupled to the liner sheet;
   wherein:
     the facestock sheet includes a label, the facestock sheet includes an unused portion defined by a die cut through the facestock sheet, and the label and the unused portion define a label boundary therebetween,
     the liner sheet includes a flap defined by a cut through the liner sheet crossing underneath the label boundary at first and second label boundary crossings and an uncut chord extending generally between the first and second label boundary crossings forming a hinge by which the flap remains integrally connected with the liner sheet when the label is removed therefrom, and
     the flap is configured to enable separation of the label from the unused portion as the label is peeled away from the liner sheet, with the unused portion remaining fixed to the liner sheet.

2. The label sheet of claim 1 wherein the cut defines a flap in the liner sheet which bends upward away from a remaining portion of the liner sheet as the label is being peeled away.

3. The label sheet of claim 2 wherein said flap is generally semicircular in shape.

4. The label sheet of claim 1 wherein the label surrounds the unused portion wherein the unused portion is internal to said label, such that when the label is peeled from the liner and the unused portion of the facestock remains on the liner, a hole is formed in the label.

5. The label sheet of claim 1 wherein the label includes a tab to encourage a user to peel the label from the liner sheet along a label peel direction.

6. The label sheet of claim 1, wherein the flap is configured to relax back toward a plane of the liner sheet after the label has been peeled away from the liner sheet.

7. The label sheet of claim 1, wherein:
   the label boundary includes a contour; and
   the cut through the liner sheet includes a first cut portion that runs underneath the unused portion and generally follows the contour of the label boundary.

8. The label sheet of claim 1 wherein the liner sheet further includes:
   a second flap defined by a second cut through the liner sheet; and
   the second flap is configured to enable separation of the label from the unused portion as the label is peeled away from the liner sheet, with the unused portion remaining fixed to the liner sheet.

9. The label sheet of claim 8, wherein the liner sheet further includes a second cut portion that crosses underneath the label boundary at the first label boundary crossing.

10. The label sheet of claim 9, wherein the liner sheet further includes a third cut portion that crosses underneath the label boundary at the second label boundary crossing.

11. The label sheet of claim 10, wherein at least one of the second cut portion and the third cut portion is generally arcuate in shape.

12. A label sheet comprising:
    a liner sheet; and
    a facestock sheet releasably coupled to the liner sheet;
    wherein:
      the facestock sheet includes two or more labels, the facestock sheet includes an unused portion defined by die cuts through the facestock sheet, and the labels and the unused portion define a label boundary therebetween, the liner sheet includes a flap defined by a cut through the liner sheet crossing underneath the label boundary at first and second label boundary crossings and an uncut chord extending generally between the first and second label boundary crossings forming a hinge by which the flap remains integrally connected with the liner sheet when the label is removed therefrom, and the flap is configured to enable separation of one of the labels from the unused portion as the one label is peeled away from the liner sheet, with the unused portion remaining fixed to the liner sheet.

13. The label sheet of claim 12, wherein the liner sheet defines a plane and the flap in the liner sheet is configured to bend away from the plane of the liner sheet as the one label is peeled away from the liner sheet.

14. The label sheet of claim 13, wherein the flap is configured to relax back toward the plane of the liner sheet after the one label has been peeled away from the liner sheet.

15. The label sheet of claim 12, wherein the label boundary includes a contour and the cut through the liner sheet includes a first cut portion that runs underneath the unused portion and generally follows the contour of the label boundary.

16. The label sheet of claim 12, wherein the liner sheet includes a second flap defined by a second cut through the liner sheet and the second flap is configured to enable separation of another one of the labels from the unused portion as the another label is peeled away from the liner sheet, with a second unused portion remaining fixed to the liner sheet.

17. The label sheet of claim 16, wherein the cut through the liner sheet further includes a second cut portion that crosses underneath the label boundary at the first label boundary crossing.

18. The label sheet of claim 17, wherein the cut through the liner sheet further includes a third cut portion that crosses underneath the label boundary at the second label boundary crossing.

19. The label sheet of claim 18, wherein one of the second cut portion and the third cut portion is generally arcuate in shape.

20. The label sheet of claim 12, wherein the first and second label boundary crossings are generally opposed to one another along the label boundary.

* * * * *